Feb. 27, 1923.
C. HARRIS
AUTOMATIC POULTRY WATERER
Original Filed May 19, 1920
1,446,701
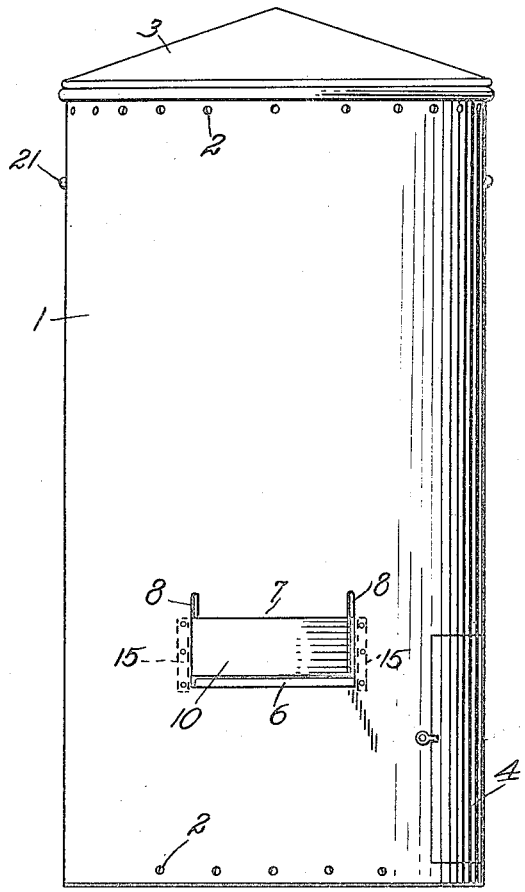
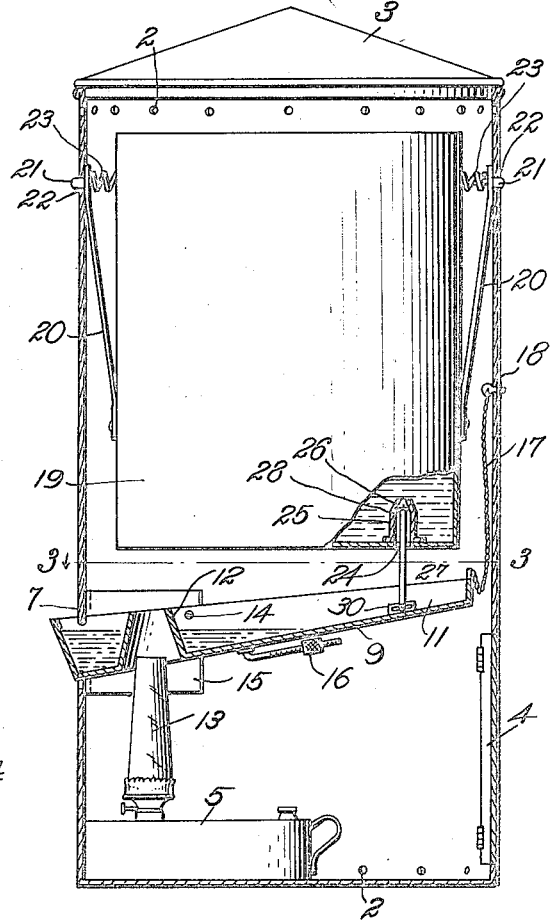
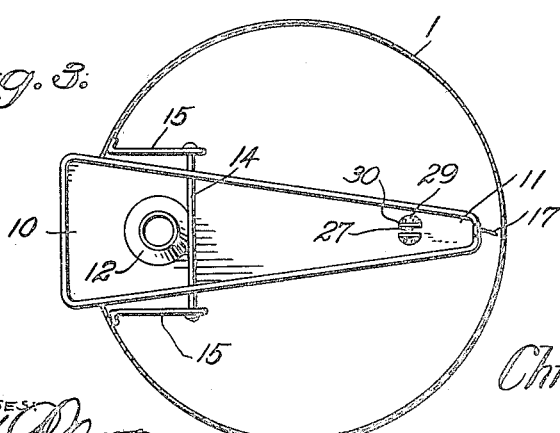
INVENTOR.
Christopher Harris,
BY
ATTORNEY.

Patented Feb. 27, 1923.

1,446,701

UNITED STATES PATENT OFFICE.

CHRISTOPHER HARRIS, OF CEYLON, MINNESOTA; F. H. KOENECKE, ADMINISTRATOR OF SAID CHRISTOPHER HARRIS, DECEASED, ASSIGNOR TO POULTRY SPECIALTY COMPANY, OF CEYLON, MINNESOTA, A CORPORATION OF MINNESOTA.

AUTOMATIC POULTRY WATERER.

Application filed May 19, 1920, Serial No. 382,459. Renewed November 20, 1922.

*To all whom it may concern:*

Be it known that I, CHRISTOPHER HARRIS, citizen of the United States, residing at Ceylon, in the county of Martin and State of Minnesota, have invented certain new and useful Improvements in Automatic Poultry Waterers, of which the following is a specification.

This invention relates to a device for supplying drinking water to poultry and has for its primary object to provide an improved watering device wherein the various parts may be readily assembled and set up to provide a self-feeding drinking receptacle of a light structure and a portable nature.

The further object of the invention is to provide an improved drinking trough and a supply tank so associated and arranged that the tank will be caused to automatically discharge into the trough at proper intervals for replenishing the drinking water therein merely upon the elevation of the drinking end of the trough.

With these and other objects in view, the invention resides in the details of construction, combination and arrangement of parts as will hereinafter be more fully pointed out and described, reference being had to the accompanying drawings, wherein—

Figure 1 is a front elevation of the improved watering device.

Figure 2 is a vertical, longitudinal section.

Figure 3 is a cross section taken on the line 3—3 of Figure 2 and

Figure 4 is a cross sectional view of the valve sleeve, looking toward the inlet opening.

In the drawing, the numeral 1 indicates a cylindrical container opened at its upper end and provided with air vents 2 formed adjacent its lower and upper ends respectively. The upper end of the container is adapted to be normally closed by a suitable cover 3. Communication with the interior of the container is also afforded through a hinged door 4 provided in the lower end and through which a heating element such as a lamp 5 is usually inserted for heating the interior of the casing and to prevent the water from freezing when the device is in the open and exposed to the weather. The container wall at what may be termed the front of the device is provided with a horizontally extending access opening 6 through which the drinking end of the trough is adapted to project exteriorly of the container and the container wall above the opening is provided with a depending portion 7 which depends into the trough, the sides of the latter being received within the slots 8 formed between the depending portion 7 and the side edges of the opening 6.

The trough comprises an elongated receptacle having a flat bottom 9, wide at its forward end 10 but tapered so that its inner end 11 is of narrow width, the side and end walls of the trough being of greater height at the wide end of the bottom than at the narrow end, thus rendering the trough shallow at one end and deep at the other. The bottom of the trough at the deep end is provided with an upwardly extending tubular cone 12 which is adapted to accommodate the upper end of the lamp globe 13 particularly when the trough is rocked on its pivot. This cone has its upper opened end on a level with the upper edges of the trough so as to always be above the water level, thus preventing any water from dripping down or splashing onto the lamp and putting it out. The cone also serves as a conductor of the heat emanating from the lamp and transmits the heat received to the water in the trough, which as will be noted, surrounds the cone on all sides. The trough is adapted to be pivotally suspended from a rod 14 which projects transversely across the trough, extending beyond the sides for engagement with supporting brackets 15, the latter being fastened to the inside of the casing and projecting inwardly on opposite sides of the trough. This rod 14 it will be noted is offset with respect to the transverse axis of the trough being located in proximity to the deepest and widest portion of the trough so that the latter may be substantially balanced; a counter balance 16 in the form of a threaded rod having an adjustable weight thereon being fixed to the under side of the trough for partly counteracting the unbalancing effect of the gathering waters which flow to the drinking end 10 of the trough when discharged from the tank. To retain the receiving end 11 of the trough at an elevation even when forced downwardly by the force of the discharge from the supply tank, one end of a chain 17 is connected to the trough, the other end of the chain being carried by a pin screwed into or otherwise fastened to the wall of the container at a point above the trough as shown at 18. This chain is slackened sufficiently to prevent any interference with the proper and necessary amount of movement required of the trough for opening the discharge valve and its function, as previously stated, is to prevent the end 11 from lowering to any extent that would prevent the necessary flow of water into the deep end 10 or that would tend to disassociate the valve mechanism.

The drinking water is contained in a substantially large cylindrical tank 19 which is lowered into place through the top and held in position above the trough by means of hangers or arms 20 which, as will be seen, comprise metallic straps bolted or riveted to the side of the tank at opposite points and adjacent its bottom end, and spaced from the side wall of the container so that the heat from the lamp can readily circulate around it. These strap hangers extend upwardly along the tank sides and are provided at their upper free ends with outstanding lugs 21 which are adapted to fit into openings 22 formed in the wall of the container for the purpose of being engaged by the lugs so that the tank may thereby be supported within the container. To enable the lugs to be more readily projected through the openings 22 and to retain them in place therein, coiled springs 23 are arranged between the free ends of the hangers and the container as shown; these springs normally expanding outwardly and tending to resiliently space the lug-bearing ends of the hangers outwardly from the side of the container so that, after inserting the tank in the container one need only turn it a bit until the lugs register with their respective openings, upon which the action of the springs will force the lug into its openings, thus providing trunnions for supporting the tank in place. The bottom of the tank is perforated with a single outlet opening as indicated at 24 through which the liquid is discharged into the underlying trough and surrounding this outlet on the side of the tank is a vertically disposed tube 25 flanged at its lower end for attachment to the bottom wall of the tank, and having its bore tapered to provide a valve seat. This tube constitutes a valve sleeve in which a valve stem 27 is slidable back and forth for alternately opening and closing the inlet 26; the head 28 of the stem being tapered correspondingly with the tapered valve seat 26 so as to have a snug fit therewith when the valve is closed, as shown in Figure 2. The lower end of the stem is connected to the shallow trough end 11 by means of a pin and slot arrangement which permits sufficient lateral play of the stem during the rocking of the trough and allows it to be readily slid back and forth within the sleeve without binding. This is accomplished by fastening to the bottom of the trough on the inside a pair of brackets 29 having each an upstanding flange 30 provided with a horizontal slot into which are received side pins carried by the lower end of the valve stem 27. It will thus be seen that during the lowering or elevation of the shallow trough end, the vertical position of the valve stem will be but slightly, if at all, affected, due to the slotted connection between the trough and the valve stem.

In using this invention, it is manifest that it may be used indoors or outside and for purposes of lifting, carrying, etc., any suitable handle means may be provided on the container. The tank is ordinarily filled by simply removing the cover of the container and pouring in the proper amount of water which in cold weather will be kept from freezing by the heat of the lighted lamp disposed below the trough; the tubular cone 12 acting, as previously pointed out, as a conductor for the heat emanating from the lamp. The initial flow may be started by lifting up the exposed trough end 20 sufficient to move the stem 27 downwardly in the sleeve 25 until the outlet 26 is opened, allowing the water to pour into the trough at 11 and flow towards the end 10. This end is of course projected exteriorly of the container a sufficient distance to permit access to the drinking water to be readily had. As the volume of the water at the end increases, the additional weight forwardly of the pivot 14 depresses the end 10 causing the end 11 to move upwardly, closing the valve and shutting off further discharge from the tank. When the water at 10 is gradually absorbed both through consumption and evaporation, so that the weight of the trough forwardly of the pivot becomes less than the weight rearwardly thereof, the end 11 will by reason of its superior weight move downwardly, opening the valve and permitting further discharge from the tank until the volume of water at the drinking end of the trough has been replenished to such an extent that it again overbalances the shallow end, in consequence of which the valve stem will be moved upwardly to again close the valve.

It will thus be seen that the valve action is automatically controlled by the weight of the trough at its forward end and that as long as the supply tank contains an adequate amount of water, the trough will be always supplied. Although the preceding description may be said to comprehend the preferred embodiment of the invention, it is nevertheless to be understood that minor changes in construction, details and arrangement of parts may be resorted to as may be found desirable and which fall within the scope of the appended claims.

Having thus described my invention what

I claim as new and desire to secure by Letters Patent is:—

1. An automatic poultry watering device including a container having its upper end provided with oppositely disposed openings, watering trough means arranged at the lower end of the container and a supply tank having a bottom discharge insertable in the upper end of the container to overhang the said trough and suspending means carried by said tank and normally standing outwardly therefrom for engaging the openings in said container whereby the said tank is resiliently supported from contact with the surrounding wall of the container.

2. In a device of the class described, the combination with a cylindrical container having suitable vent openings and an access opening of a balancing trough extending through said access opening comprising an elongated tapering receptacle, the inner end being reduced, the bottom of the wide end having an upstanding cone, serving as a heat conductor, a rod passing through said container and trough to pivotally hold said trough, a tank held above said trough, a valve in said tank having a stem in contact with said trough and actuated thereby, and a lamp below said cone, all as and for the purpose set forth.

In testimony whereof I affix my signature in presence of two witnesses.

CHRISTOPHER HARRIS.

Witnesses:
ANNA M. LENZ,
ANDREW C. KELY.